United States Patent
Cornsweet

[15] 3,639,041
[45] Feb. 1, 1972

[54] SYSTEM AND METHOD FOR SCANNING THE DEPTH OF THE OPTIC FUNDUS

[72] Inventor: Tom N. Cornsweet, Atherton, Calif.
[73] Assignee: Stanford Research Institute, Menlo Park, Calif.
[22] Filed: Sept. 21, 1970
[21] Appl. No.: 73,990

[52] U.S. Cl.................................351/14, 351/6, 351/7, 351/13, 351/16, 351/39, 356/120, 356/124
[51] Int. Cl..................A61b 3/10, G01b 11/30, G01b 9/00
[58] Field of Search......................351/6, 7, 13, 14, 16, 39, 1; 356/120, 124

[56] References Cited

UNITED STATES PATENTS

| | | | |
|---|---|---|---|
| 3,136,839 | 6/1964 | Safer | 351/16 X |
| 3,524,702 | 8/1970 | Bellows et al. | 351/6 |
| 3,572,909 | 3/1971 | Van Patten | 351/6 |
| 3,565,568 | 2/1971 | Hock | 356/120 X |

OTHER PUBLICATIONS

F. W. Campbell et al., "High-Speed Infrared Optometer," JOSA, vol. 49, No. 3, pps. 268–272, Mar. 1959
Niles Roth, "Automatic Optometer...Undrugged Human Eye," The Review of Scientific Instruments, Vol. 36, no. 11, pps. 1636–1639, Nov. 1965
Jay Warshawsky, "High-Resolution Optometer...," JOSA, vol. 54, no. 3, pps. 375–379, Mar. 1964
Merrill J. Allen et al., "An Infrared Optometer...," Amer. J. Optom. & Arch Amer. Acad. Opt., vol. 37, pp. 403–407, 1960

*Primary Examiner*—David Schonberg
*Assistant Examiner*—Paul A. Sacher
*Attorney*—Flehr, Hohbach, Test, Albritton and Herbert

[57] ABSTRACT

A system and method for obtaining a depth profile of the fundus of the eye in which first and second alternately excited light sources image an aperture on a portion of the optic disk. The refractive power of the eye is held approximately constant by having the eye look at a fixation point. A detector is provided for sensing the degree of overlap of the aperture images due to the first and second light sources. In one embodiment the aperture is displaced in a Z-direction with respect to the eye until the images of the aperture completely overlap. The aperture is then successively displaced horizontally in an X-direction and/or vertically in a Y-direction with respect to the eye and in each position the aperture is adjusted in the Z-direction until the first and second images of the aperture completely overlap. The positions of the aperture where the first and second images thereof overlap correspond to the depth of the respective portions of the optic fundus from any arbitrary point at the front of the eye.

8 Claims, 4 Drawing Figures

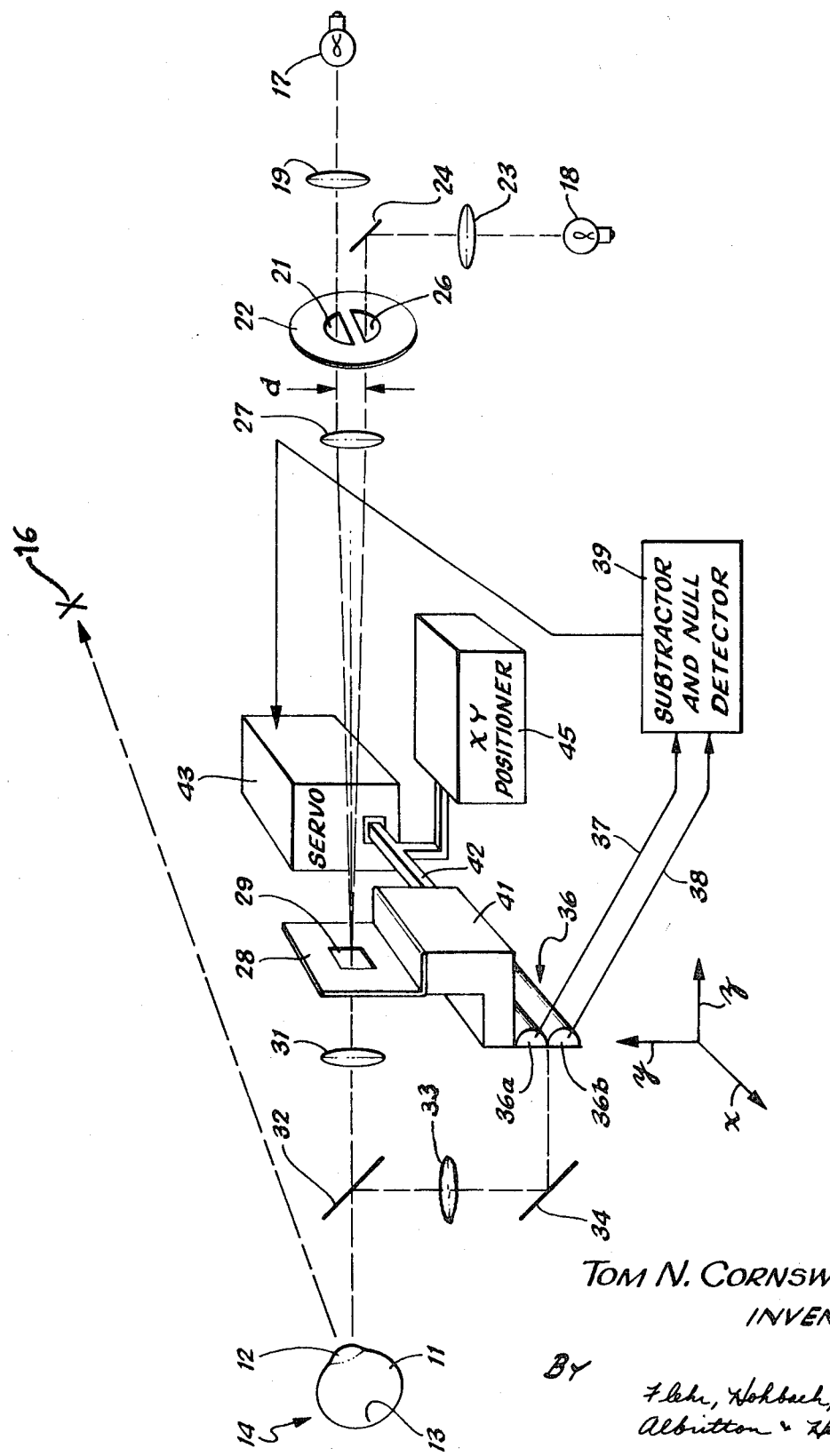

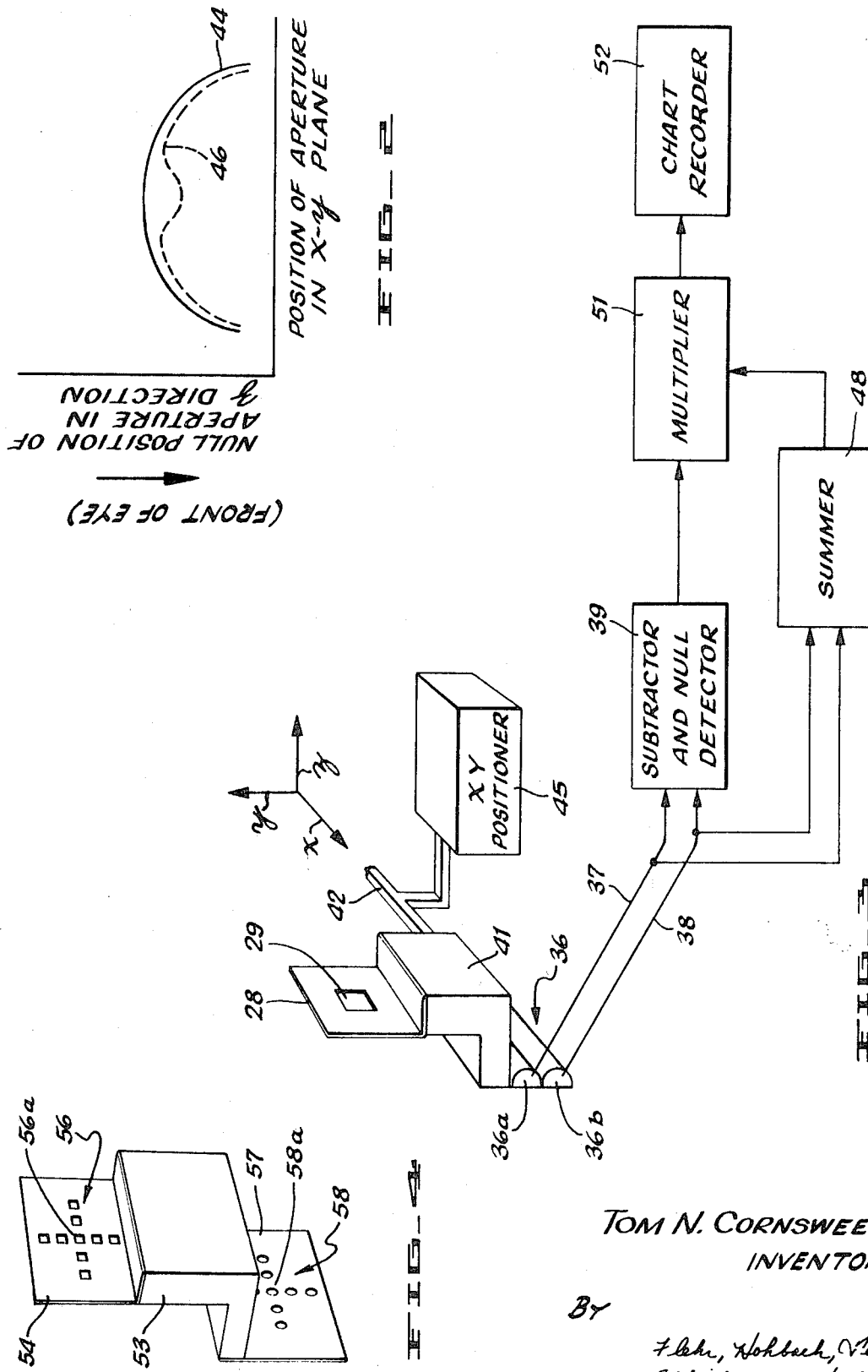

SYSTEM AND METHOD FOR SCANNING THE DEPTH OF THE OPTIC FUNDUS

BACKGROUND OF THE INVENTION

Certain pathological conditions are accompanied by a bulging or cupping of the optic fundus in the vicinity of the optic nerve head in the eye. For example, in the case of brain tumors, the normal pressure differential between the interior of the skull and the interior of the eye may change. This change in pressure differential can cause bulging of the optic nerve head, or disk into the eye.

Glaucoma is a disorder that is almost invariably accompanied by a cupping of the optic disk (a bulging out of the eye). In the case of glaucoma, the cupping is due to atrophy of the nerve fibers in the eye and possibly to an increase in the intraocular pressure. It is therefore apparent that it is desirable to have a method and system for detecting such bulging or cupping.

Opthalmoscopes are commonly used to look into a patient's eye in an attempt to visually detect bulging or cupping of the optic disk. Such visual examinations, however, have not proven to manifest a desirable degree of reliability or accuracy.

What is needed is a fast and accurate method and system for measuring bulging or cupping of the optic fundus for use in diagnosis of pathological conditions, especially glaucoma. Such a method and system might also be useful for broad screening of a large number of patients such as in hospitals, mobile medical units or possibly as a routine procedure in connection with obtaining a driver's license.

SUMMARY OF THE INVENTION

Accordingly, it is an object of this invention to provide an improved method and system for detecting bulging or cupping of regions of the optic fundus by obtaining a depth profile of the optic fundus.

Briefly, in accordance with one embodiment of the invention, an image of an aperture is formed on the fundus of a patient's eye. A fixation point is provided for the patient to look at in order that the refractive strength of the eye stays approximately constant. Means are provided for varying the axial distance between the aperture and the optic fundus until the aperture is in sharp focus on the fundus. The image of the aperture is caused to scan across different portions of the fundus; the axial position of the aperture that produces a sharply focused image on the fundus is a direct measure of the distance between an arbitrary point on the front of the eye (such as the nodal point, or "optical center" of the eye and the fundus at the point where the aperture is imaged. Therefore, as the aperture scans across the fundus, the differing axial distance of the aperture with respect to the fundus for a sharply focused image of the aperture to be produced thereon is a depth profile of the scanned region of the optic fundus.

BRIEF DESCRIPTION OF THE DRAWINGS

FIG. 1 is a system diagram of an optic fundus depth scanner illustrating the manner in which an aperture may be moved in x, y, and z directions.

FIG. 2 is a graph of the null position of the aperture in the z direction versus the position of the aperture in the XY plane for both a normal fundus and one in which there is bulging of the optic disk.

FIG. 3 is similar to FIG. 1 but shows another embodiment of a portion of an optic fundus depth scanner in which it is not necessary to adjust the z position of the aperture means for every position of the aperture in the XY plane.

FIG. 4 shows another embodiment of aperture and detecting means which utilizes a plurality of apertures and a plurality of photodetectors for simultaneously scanning a plurality of portions of the optic fundus.

DESCRIPTION OF THE PREFERRED EMBODIMENTS

An automatic optometer measures the refractive power of the eye by projecting narrow beams of light at at least two areas of the entrance pupil of the eye, the refractive surfaces of the eye directing the beams to the retina. The refractive elements of the eye are primarily the air-to-cornea interface and the various interfaces related to the lens within the eye. For general purposes, all of these elements may be considered as a single refractive element, which will be referred to herein as the eye lens. If the angles at which the beams strike the eye lens are properly related to the focusing power of the eye lens, the beam will be directed onto the same area of the retina i.e., they will completely overlap.

The angles at which the beams enter the eye lens may be controlled by placing an aperture in the path of the beams and varying the distance between the aperture and the eye lens.

If the relative angles of incidence of the beams and the refractive or focusing power of the eye lens are not properly related, the images of the aperture on the retina will be separated. A determination of whether the images on the retina are overlapping or not is made by directing light passing out of the eye lens through a converging lens which forms an image of the light patterns that are present on the retina. The relative angles of incidence of the narrow beams on the eye lens are then altered by moving the aperture to make the retina images overlap and the angles required to achieve overlapping indicate refractive power of the eye lens. However, if the refractive strength of the eye does not change, but the image of the aperture is caused to scan across different parts of the retina, then the position of the aperture with respect to the eye lens for the aperture image to be sharply focused on the retina is a direct measure of the distance between an arbitrary point at the front of the eye (such as nodal point of the eye) and the retina at the point where the aperture is imaged. Therefore, if the patient steadily views some target at a fixed position in space so that his refractive changes are small and random and the aperture is made to scan across the part of the retina that is of interest, with the position of the aperture being adjusted at each point of the scan such that the two images of the aperture overlap, the resulting read out of the positions of the aperture during the scan is a depth profile of the scanned region of the retina.

Referring to FIG. 1 an eye 11 having a lens 12 and a retina 13 is disposed at an eye station generally indicated by reference numeral 14. A fixation point or object 16 is provided for the eye 11 to focus on so that refractive changes in the eye lens 12 will be small and random. Light sources 17 and 18 are provided, which according to one embodiment are alternately excited xenon flash lamps. A lens 19 images the light source 17 in an aperture 21 of a plane 22. A lens 23 and a mirror 24 image the light source 18 in an aperture 26 of the plane 22. The light sources 17 and 18 are adapted to be alternately excited so that the apertures 21 and 26 of the plane 22 are alternately illuminated. Light passing through apertures 21 and 26 is collimated by a lens 27. The collimated light passing through the lens 27 is incident on a plane 28. The plane 28 has an aperture 29 which passes a portion of the collimated light from the lens 27. A lens 31 and a beamsplitter 32 (which may, for example, be a half-silvered mirror) are situated between the plane 28 and the eye station 14. The lens 31 images the light from the light sources 17 and 18 (and apertures 21 and 26) through the beam splitter 32 onto the plane of the eye lens 12. Thus only a very narrow beam of light proportional to the area of the semicircular area 21 or 26 passes through the eye lens 12 at any instant.

The aperture 29 is adapted to be imaged by the lens 31 and the eye lens 12 on the retina 13 of the eye 11. If the plane 28 is located in the z direction (as shown by the rectangular x, y, and z coordinance in FIG. 1) with respect to the lens 31 and the eye lens 12 such that the image of the aperture 29 is sharply focused on the retina 13, the image will not move as the light sources 17 and 18 are alternated. However, if the plane 28 is not conjugate with the retina 13, then the image of the aperture 29 will shift back and forth on the retina 13 as the light sources 17 and 18 are alternated due to the distance $d$ which separate the semicircular apertures 21 and 26 in the plane 22. Thus a composite image is formed on the retina 13 as the light sources 17 and 18 alternate which is comprised of a first image of the aperture 29 due to the light source 17 and a second image of the aperture 29 due to the light source 18. With any given refractive power of the eye lens 12 the images of the aperture 29 on the retina 13 as the light sources 17 and 18 are alternated may be sharply focused such that they completely overlap by displacing the plane 28 in the $z$ direction until the aperture 29 is conjugate with the retina 13.

Detecting means is provided for sensing the sharpness of focus of the composite image of aperture 29 on the retina 13; that is, the degree of overlap of the two images of the aperture 29. The beam splitter 32 is adapted to reflect the composite image on retina 13 through a lens 33 to a mirror 34 which in turn reflects the composite image to a photodetector 36. The photodetector 36 comprises an arrangement for sensing the distribution of light falling thereon and may conveniently be a split field photodetector having fields 36a and 36b. Photodetecting means having more than two fields may obviously be substituted for the split field photodetector 36. Conductors 37 and 38 connect the fields 36a and 36b respectively to a subtractor and null detector 39. If the aperture 29 is sharply focused on the retina 13 then its image does not move as the light sources 17 and 18 are alternated. In this case the light sensed by the two photodetector fields 36a and 36b will not vary as the light sources are alternated (the intensities of the two sources are equated before operating). The subtractor and null detector 39 subtracts the electrical outputs of the two fields 36a and 36b which are present on conductors 37 and 38 and detects an AC null of the difference between them.

As illustrated in FIG. 1, both the photodetector 36 and the plane 28 having the aperture 29 therein are affixed to an adjustable member 41. The adjustable member 41 is connected through an arm 42 to a servo 43. The servo 43 receives the output of the subtractor and null detector 39 as an input and is responsive thereto to adjust the adjustable member 41 back and forth along the $z$ direction until there is a null output from the subtractor and null detector 39. The servo 43 is adapted to sense which direction along the $z$ axis to shift the plane 28 by comparing the phase of signals from the photodetector 36 with the phase of the alternation of light sources 17 and 18. When there is such a null output the aperture 29 is sharply focused on the retina 13. The position of the plane 28 for the null in the $z$ direction is then recorded. As shown in FIG. 1 an XY positioner 45 is provided and is adapted to selectively move the adjustable member 41 and hence the aperture 29 to various points in the XY plane. The position of the aperture 29 with respect to the eye 11 is thus successively moved to new points in the XY plane. At each of these new points the servo 43 adjusts the adjustable member 41 in the $z$ direction and hence the aperture 29 until it is sharply focused on the retina 13 so that a null output is detected on the output of the subtractor and null detector 39. This null position of the plane 28 in the $z$ direction is also then recorded. The adjustable member 41 is then displaced to a new position in the XY plane and is adjusted by servo 43 until the aperture 29 is again sharply focused on the retina 13. This position in the $z$ direction is also then recorded. This procedure is repeated for as many points in the XY plane as desired. In this manner a depth profile of the retina 13 showing the depth of the retina 13 from an arbitrary point at the front of the eye is obtained. That is, as the position of the aperture 29 shifts in the XY plane the composite image thereof formed on the retina 13 is formed on different portions of the retina 13. With the refractive power of the eye 11 held constant by having it look at the fixation point 16, the position of the aperture 29 in the $z$ direction for the composite image thereof to be sharply focused on the retina 13 is proportional to the distance between the portion of the retina on which the composite image of the aperture 29 falls and an arbitrary point toward the front of the eye, such as the nodal point of the eye. Thus, referring to FIG. 2, there is shown a graph in which the null position of the aperture 29 in the $z$ direction is plotted against the position (say along the $x$ direction) of aperture 29 in the XY plane. For a normal eye in which there is little bulging or cupping of the optic disk a curve illustrated by the solid line 44 results which is a continuous curve proportional to the depth of the scanned portions of the retina from an arbitrary point at the front of the eye. However, if there is any bulging or cupping of the optic nerve head, a curve such as the dotted curve 46 in FIG. 2 will result. The bulging or cupping is reflected in a bulging or cupping of the curve 46. (The dashed curve in FIG. 2 represents what would be called bulging, while a bulge upward in the figure would ordinarily be called cupping.)

FIG. 3 shows another embodiment of the invention in which it is not necessary to adjust the adjustable member 41 in the $z$ direction for each position in the XY plane. In FIG. 3 only the adjustable member 41 with the photodetector 36 and plane 28 is shown. The lenses, light sources and mirrors for the embodiment shown in FIG. 3 are the same as in FIG. 1. In FIG. 3 the adjustable member 41 is, as before, connected through the member 42 to an XY positioner 45 which is adapted to move the adjustable member 41 and hence the plane 28 and aperture 29 to various points in the XY plane. The split field photodetector 36 having fields 36a and 36b is connected via conductors 37 and 38 to a subtractor 39. The conductors 37 and 38 also form the input to a summer 48. The output of the subtractor 39 is connected to a multiplier 51. The multiplier 51 also receives the output of summer 48 as an input. The output of multiplier 51 drives a chart recorder 52.

In operation, the position of the adjustable member 41 and hence the aperture 29 in the $z$ direction is adjusted (the adjustment may be manual or servo-controlled until the aperture 29 is sharply focused on a portion of the retina so that the output of the subtractor 39 is a nonvarying quantity; that is, it has no AC components. The output of subtractor 39 also forms an input to the multiplier 51. Another input to the multiplier 51 is the output of the summer 48. This sum is proportional to the total amount of light falling on the photodetector. Multiplier 51 multiplies the output of the subtractor 39 with the sum of the outputs of the two fields 36a and 36b of the photodetector. Thus, the AC output of the multiplier 51 as the aperture 29 is displaced in the XY plane is proportional to the amount by which the composite image of the aperture 29 is defocused on the portions of the retina that are being scanned. This directly indicates the depths of these portions of the retina with respect to an arbitrary point at the front of the eye as the aperture 29 is moved in the XY plane. The output of the multiplier 51 can be recorded, for example, on a chart recorder 52 which will yield a depth profile similar to that shown in FIG. 2. An examination of this depth profile will reveal any bulging or cupping of the optic fundus.

The purpose of the multiplier 51 is to correct for possible sources of error. The distance through which the image of the aperture 29 shifts as the light sources 17 and 18 are alternated is directly proportional to the depth of the fundus at the point where the image falls. However, the amounts of light falling on the photodetector fields is measured rather than the displacement of the images. If everything were perfectly constant, then those amounts of light would be linear with the shifts in position of the images and the AC component of the difference between the amounts of light would be an accurate indication of the depth of the fundus. If the light intensity falling on the photodetector fields changes for any reason than the outputs of the photodetector fields changes, thus giving false depth indications. The light intensity can change for a number of reasons, such as the lamps themselves changing, the pupil of the patient's eye changing its diameter, or the images falling on regions of the retina whose reflection characteristics are different. To compensate for these possible sources of error, it is necessary to measure the actual intensity of light and correct for any changes in it. The sum signal from summer 48 is a measure of the total intensity of the light and therefore, when it is properly introduced as a multiplying factor, it corrects for changes in the intensity of the light. It should be noted, however, that errors due to changes in light intensity are not present when the AC output is nulled at each position in the XY plane by displacing the aperture 29 in the z direction as in the other embodiments herein. The null is unaffected by changes in the light intensity.

Of course, instead of moving the aperture 29 in the XY plane so that the depth profile of the retina is obtained sequentially it is possible to provide a plurality of apertures and a plurality of photodetectors such that all measurements are made simultaneously. Thus, referring to FIG. 4, a support member 53 supports a plane 54 which has a plurality of apertures 56 therein. The support member 53 also supports a member 57 which has a plurality of split-field photodetectors 58 arranged in the same respective orientation as are the apertures 56. Each of the photodetectors 58 requires electronics such as shown in the embodiment of FIG. 3 which include a subtractor, a summer, and a multiplier. Alternately one set of electronics can be provided with the outputs of the photodetectors 58 sequentially applied to the electronics.

In operation, with the arrangement shown in FIG. 4, the position of the plane 54 is adjusted in the z direction until the aperture 56a is sharply focused on a portion of the retina such that the difference between the two fields of the split field photo detector 58a contains no AC components. The AC outputs from the difference between the two signals on the split fields of each of the other photodetectors 58 is multiplied by the sum of the signals generated by the two split fields of each of the respective photodetectors. These various signals are then representative of the depths of the various portions of the retina on which the composite images of the apertures 56 fall with respect to an arbitrary point at the front of the eye. The signals can be applied to a chart recorder as was done in connection with the embodiment of FIG. 3 to generate a graph such as that shown in FIG. 2 in which bulging or cupping of the optic nerve head is indicated by the bulging or cupping of a curve generated by the chart recorder.

Thus what has been described is an improved method and system for scanning a retina in order to detect bulging or cupping of the optic fundus. This is done by obtaining a depth profile of the fundus which is achieved by projecting light images into the eye and sensing the images that are formed on the fundus. Although the invention has been described with respect to specific embodiments thereof it should be obvious to those skilled in the art that minor modifications and changes may be made to the embodiments disclosed herein without departing from the true spirit and scope of the invention.

We claim:

1. An optic fundus depth scanner for use with an eye having an optic fundus and a lens and adapted to scan the fundus thereof comprising an eye station for establishing the position of the eye with respect to $x$, $y$, and $z$ directions, fixation means for the eye to look at whereby the refractive power of the eye is approximately constant, light means for projecting light in first and second predetermined optical paths generally in the $z$ direction, plane means spaced from said light means in the $z$ direction and having aperture means for passing portions of projected light from said light means therethrough, lens means positioned between said plane means and said eye station in the $z$ direction for forming an image of said light means on the eye lens whereby light passes through the eye lens and falls on portions of the optic fundus to form composite images of said aperture means thereon, detecting means for detecting the sharpness of focus of said composite images of said aperture means on said portions of the optic fundus, means for successively displacing said plane means in the XY plane formed by the $x$ and $y$ directions whereby the composite image of said aperture falls on successive other portions of the optic fundus, and indicating means coupled to said detecting means and responsive to the sharpness of focus of said composite images of said aperture means on the portions of the optic fundus to indicate the relative respective distances between the portions of the optic fundus and the eye lens whereby a profile of the optic fundus is obtained.

2. The optic fundus depth scanner of claim 1 wherein said detecting means comprises a split field photodetector having first and second fields, optical means for coupling said split field photodetector generates electrical signals indicative of the sharpness of focus of said composite image of said aperture means on the portion of the optic fundus.

3. The optic fundus depth scanner of claim 1 wherein said aperture means comprises a plurality of apertures spaced from one another in the XY plane and wherein said detecting means comprises a plurality of photodetectors spaced from one another in the XY plane for respectively detecting the sharpness of focus of said composite images of each of said apertures.

4. A method of scanning the optic fundus of an eye having an optic fundus and a lens comprising the steps of establishing the position of the eye at an eye station with respect to $x$, $y$, and $z$ directions, providing a fixation point for the eye to look at whereby the refractive power of the eye is approximately constant, projecting light in first and second predetermined optical paths generally in the $z$ direction, passing a portion of the projected light through an aperture in a plane, imaging the portion of projected light on the eye lens whereby an image of the aperture is formed on the portion of the optic fundus, displacing the plane in the $z$ direction until the aperture is sharply focused on the portion of the optic funds whereby the position of the plane means in the $z$ direction corresponds to the distance of the portion of the optic funds from the eye lens, displacing the plane successively to a plurality of positions in the XY plane formed by the $x$ and $y$ directions whereby images of the aperture are successively formed on a plurality of portions of the optic fundus, displacing the plane in the $z$ direction for each of the positions in the XY plane until the aperture is sharply focused on the respective portions of the optic fundus whereby the successive positions of the plane means in the $z$ direction correspond to the distance of the respective portions of the optic fundus from the eye lens.

5. An optic fundus depth scanner for use with an eye having an optic fundus and a lens and adapted to scan the fundus thereof comprising an eye station for establishing the position of the eye with respect to $x$, $y$, and $z$ directions, fixation means for the eye to look at whereby the refractive power of the eye is approximately constant, light means for projecting light in first and second predetermined optical paths generally in the $z$ direction, a first lens spaced from said light means in the $z$ direction for collimating said light from said light means, plane means spaced from said first lens in the $z$ direction and having an aperture for passing a portion of collimated light from said first lens therethrough, a second lens positioned between said plane means and said eye station in the $z$ direction for forming an image of said light means on the eye lens whereby light passes through the eye lens and falls on a portion of the optic fundus to form a composite image of said aperture thereon, detecting means for detecting sharpness of focus of said composite image of said aperture on said portion of the optic fundus, means for displacing said plane means in the $z$ direction until said detecting means indicates that said composite image of said aperture is sharply focused on said portion of the optic fundus whereby the position of said plane means in the $z$ direction corresponds to the distance of said portion of the optic fundus from the eye lens, means for successively displacing said plane means in the XY plane formed by the $x$ and $y$ directions whereby the composite image of said aperture falls on successive other portions of the optic fundus, and indicating means coupled to said detecting means and responsive to the sharpness of focus of said composite image of said aperture on the successive other portions of the optic fundus to indicate the respective distances between the successive other portions of the optic fundus and the eye lens.

6. The optic fundus depth scanner of claim 5 wherein said indicating means comprises means for displacing said plane means in the z direction at each successive position of said plane means in the XY plane until said detecting means indicates that said composite image of said aperture for each of the successive positions of the plane means in the XY plane is sharply focused on the respective other portion of the optic fundus.

7. The optic fundus depth scanner of claim 3 wherein said light means comprises first and second light sources which are alternately excited to alternately project light along said respective first and second predetermined optical paths whereby images of said first and second light sources are formed on first and second portions of the eye lens and first and second images of said aperture form said composite image on a portion of the optic fundus, the sharpness of focus of said composite image determined by the amount of overlap of said first and second images of said aperture, and wherein said detecting means comprises a split field photodetector having first and second fields and optical means for coupling said split field photodetector to said eye station whereby said split field photodetector generates electrical signals indicative of the sharpness of focus of said composite image of said aperture on the portion of the optic fundus.

8. The optic fundus depth scanner of claim 7 wherein said indicating means comprises means for calculating the difference between the amounts of light falling on said respective first and second fields of said split field photodetector and generating a difference signal for each position of said aperture in the XY plane, means for summing the amounts of light falling on said respective first and second fields of said split field photodetector and generating a sum signal for each position of said aperture in the XY plane, and means for multiplying said difference signal with said sum signal for each position of said aperture in the XY plane to form an output, said output being proportional to the respective distance between the portion of the optic fundus upon which said aperture is imaged for each position of said aperture in the XY plane and the eye lens whereby a depth profile of the optic fundus is obtained.

* * * * *